Patented Aug. 15, 1939

2,169,537

UNITED STATES PATENT OFFICE 2,169,537

MANUFACTURE OF FILMS

Armin Ossenbrunner and Max Hagedorn, Dessau, Anhalt, and Gustav Wilmanns, Wolfen, Kreis Bitterfeld, Germany, assignors, by mesne assignments, to Agfa Ansco Corporation, Binghamton, N. Y., a corporation of Delaware No Drawing. Application April 8, 1937, Serial No. 135,814. In Germany March 4, 1933

8 Claims. (Cl. 106—40)

Our invention relates to the manufacture of film and more particularly to the manufacture of films of cellulose acetate. It is a continuation in part of our application Ser. No. 713,772 filed March 2, 1934.

One of its objects is an improved process of manufacturing film. Further objects will be seen from the detailed specification following hereafter.

As it is known, methylene chloride in conjunction with alcohol constitutes a very good solvent for cellulose acetate of any degree of acetylation. The mechanical properties of films of acetyl cellulose prepared with the usual combination of methylene chloride and methyl alcohol or ethyl alcohol as a solvent, however, show little difference from the mechanical data of films made with acetone or mixtures containing acetone.

Films made from a solution of cellulose acetate in mixtures of methylene chloride with butanol and an amyl alcohol have better properties.

Solutions of cellulose acetate in mixtures of higher alcohols and methylene chloride yield glass-clear films only within narrow limits of the proportion of the constituents of the mixture. Therefore, when films are produced on an industrial scale there are often obtained films becoming turpid or white by the precipitatory action of the higher alcohols. Moreover the great difference between the boiling points of methylene chloride and the higher homologous alcohols has an unfavorable effect in manufacture. The higher the boiling point of the alcohol used in the mixture, the more there remains of this substance after evaporation of the methylene chloride and the more it acts as a precipitant.

According to this invention the manufacture of films is greatly improved by using a casting solution, which besides methylene chloride and one or more higher alcohols contains a chlorinated aliphatic hydrocarbon having a higher boiling point than methylene chloride. Naturally a hydrocarbon of the kind named must be selected the boiling point of which is lower than that of the highest boiling alcohol of the mixture. If a chlorinated hydrocarbon of higher boiling point were employed, parts of it would remain in the cellulose material after evaporation of the alcohol and would act as softening agent. The chlorinated hydrocarbon may be used either alone or mixed with alcohols capable of dissolving cellulose acetate. Suitable chlorinated hydrocarbons are for instance chloroform, dichlorethane, trichlorethane, dichlorpropane and so on.

The films prepared from such mixtures possess very good mechanical data, which could hitherto not be obtained by use of mixtures containing besides higher alcohols only methylene chloride.

By the process according to the invention various advantages are arrived at:

1. The proportion of the components to each other in a mixture available under this invention in the manufacture of a transparent and mechanically highly valuable film, viz. chlorinated hydrocarbon, higher alcohol and methylene chloride may be varied within wide limits. Thus when using methylene chloride in admixture with amyl alcohol as a solvent for a cellulose acetate containing 56 per cent of acetic acid, this solvent is applicable only if at most 20 parts of alcohol are used on 80 parts of methylene chloride. In view of the low boiling point of methylene chloride there may easily occur slight losses of this constituent in the solution during manufacture so that jelly-like solutions are obtained which yield unserviceable film. When mixing equal portions of methylene chloride and chloroform, 35 parts of amyl alcohol may be used on 65 parts of halogenated hydrocarbon.

2. The losses in the recovery of solvent are reduced due to the higher boiling point of the chlorinated hydrocarbons.

3. The structure of the film is uniform because the precipitation of the film is effected gradually by the use of the higher boiling chlorinated hydrocarbons.

4. The film may be more easily stripped from the casting support. The sudden and thorough precipitation which occurs when using methylene chloride as the sole hydrocarbon together with a higher alcohol, nearly always causes the film, if a film is obtained, to adhere firmly to the casting support, so that it can be detached therefrom only by a strong pull, which causes an excessive strain on the film or shortens the life of the support, and frequently even causes the film to be rent or torn.

5. Particularly the possibility of using the amyl alcohol in a wide range of proportions permits the making of films of cellulose acetate in a technically simple operation and such films have mechanical properties not hitherto attained by a simple casting process. The life of the film cast according to our process is considerably prolonged.

6. The mixture of methylene chloride and chloroform obtained when producing methylene chloride on an industrial scale may be used without separation together with an alcohol as a solvent for cellulose acetate. Such mixtures contain for instance, besides 7 parts of methylene chloride, 3 parts of chloroform.

The following examples illustrate the invention:

(1) Acetyl cellulose containing 56 per cent of acetic acid is dissolved in a mixture of methylene chloride, chloroform and propanol in the proportions of 4:7:3 to form a solution of 16 per cent strength, while at the same time 15 parts of triphenylphosphate and 5 parts of phthalic acid diethyl ester, calculated on 100 parts of acetyl cellulose, are added. The solution is cast in known manner to a film of about 0.135 mm. thickness. When torn in Schopper's dynamometer, or creased in Schopper's Celluloid folder, or examined in Schopper's impact-testing machine, such a film shows data which are far superior to those of a film prepared in the same manner, but with the use of a mixture of methylene chloride, chloroform and methanol in the proportions of 5:7:10 as a solvent.

|  | Breaking load, kg. | Elongation, percent | Creasing number at a thickness of 0.130 mm. | Impact test in the impact testing machine of the pendulum type, kg. cm/cm.³ |
|---|---|---|---|---|
| Methylene chloride, chloroform, propanol (4:7:3) | 98 | 31 | 173 | 234 |
| Methylene chloride, chloroform, methanol (5:7:10) | 91 | 29 | 80 | 172 |

(2) When working according to Example 1, but using as a solvent a mixture of methylene chloride, chloroform and butanol in the proportions of 4:8:8, the film obtained having a thickness of 0.130 mm. shows the following mechanical data:

| Breaking load, kg. | Elongation, percent | Creasing number | Impact test in the impact-testing machine of the pendulum type, kg. cm/cm.³ |
|---|---|---|---|
| 100 | 35 | 196 | 303 |

(3) When dissolving acetyl cellulose in a mixture of methylenechloride, chloroform and amyl alcohol in proportion of 4:10:4 to form a solution of 16 per cent strength and casting the solution to form a film of 0.130 mm. thickness, this has the following mechanical data:

| Breaking load, kg. | Elongation, percent | Creasing number | Impact test in the impact-testing machine of the pendulum type, kg. cm/cm.³ |
|---|---|---|---|
| 96 | 33 | 171 | 331 |

(4) Acetyl cellulose is dissolved in a mixture consisting of 7 parts of methylene chloride, 7 parts of ethylene chloride and 2 parts of amyl alcohol to form a solution of 16 per cent strength and the solution is cast to form a film of 0.130 mm. thickness. The film has the following mechanical data:

| Breaking load, kg. | Elongation, percent | Creasing number | Impact test in the impact-testing machine of the pendulum type, kg. cm/cm.³ |
|---|---|---|---|
| 95 | 34 | 150 | 240 |

The power for dissolving cellulose acetate of chlorinated aliphatic hydrocarbons, having a higher boiling point than methylene chloride, is inferior to that of methylene chloride so that only comparatively small amounts of alcohol can be used when employing such higher boiling chlorinated hydrocarbons without the addition of methylene chloride. To operate with solutions containing no methylene chloride is, therefore, less advantageous and yield films having inferior mechanical properties.

Our invention is not limited to the examples given, but we wish to include all such modifications as fall within the scope of the appended claims.

What we claim is:

1. In the manufacture of films from a solution of cellulose acetate, the step which comprises dissolving cellulose acetate in a solvent mixture consisting of up to 40 per cent of a higher homolog of ethyl alcohol, said homolog containing in its molecule no more than 5 carbon atoms, methylene chloride and a chlorinated hydrocarbon having a boiling point higher than methylene chloride, but lower than the alcohol, said cellulose acetate solution being capable of being cast to form clear films.

2. In the manufacture of films from a solution of cellulose acetate the step which comprises dissolving cellulose acetate in a solvent mixture consisting of methylene chloride, chloroform and butanol in the ratio 4:8:8, said cellulose acetate solution being capable of being cast to form clear films.

3. In the manufacture of films from a solution of cellulose acetate the step which comprises dissolving cellulose acetate in a solvent mixture consisting of methylene chloride, chloroform and amyl alcohol in the ratio 4:10:4, said cellulose acetate solution being capable of being cast to form clear films.

4. In the manufacture of films from a solution of cellulose acetate the step which comprises dissolving cellulose acetate in a solvent mixture consisting of methylene chloride, ethylene chloride and amyl alcohol in the ratio 7:7:2, said cellulose acetate solution being capable of being cast to form clear films.

5. A composition of matter containing cellulose acetate dissolved in a solvent mixture consisting of up to 40 per cent of a higher homolog of ethyl alcohol, said homolog containing in its molecule no more than 5 carbon atoms, methylene chloride and a chlorinated hydrocarbon boiling higher than methylene chloride, but lower than the alcohol, said cellulose acetate solution being capable of being cast to form clear films.

6. A composition of matter containing cellulose acetate dissolved in a solvent mixture consisting of methylene chloride, chloroform and up to 40 per cent of butanol, said cellulose acetate solution being capable of being cast to form clear films.

7. A composition of matter containing cellulose acetate dissolved in a solvent mixture consisting of methylene chloride, chloroform and up to 22 per cent of amyl alcohol, said cellulose acetate solution being capable of being cast to form clear films.

8. A composition of matter containing cellulose acetate dissolved in a solvent mixture consisting of methylene chloride, ethylene chloride and up to 22 per cent of amyl alcohol, said cellulose acetate solution being capable of being cast to form clear films.

ARMIN OSSENBRUNNER.
MAX HAGEDORN.
GUSTAV WILMANNS.